(12) United States Patent
Waldinger et al.

(10) Patent No.: US 7,714,856 B2
(45) Date of Patent: May 11, 2010

(54) METHOD AND DEVICE FOR THE REPRESENTATION OF A PREDETERMINABLE REGION IN MULTIDIMENSIONAL DATA SETS

(75) Inventors: Johannas Waldinger, Ottobrunn (DE); Bernhard Mumm, Mammendorf (DE); Rolf Baumann, München (DE); Martin Hoeschen, Rudelzhausen (DE)

(73) Assignee: Tomtec Imaging Systems GmbH (DE)

( * ) Notice: Subject to any disclaimer, the term of this patent is extended or adjusted under 35 U.S.C. 154(b) by 500 days.

(21) Appl. No.: 10/567,816

(22) PCT Filed: Jun. 29, 2004

(86) PCT No.: PCT/EP2004/007044
§ 371 (c)(1),
(2), (4) Date: Sep. 26, 2007

(87) PCT Pub. No.: WO2005/031655
PCT Pub. Date: Apr. 7, 2005

(65) Prior Publication Data
US 2008/0154952 A1    Jun. 26, 2008

(30) Foreign Application Priority Data
Aug. 29, 2003 (DE) .................. 103 39 979

(51) Int. Cl.
*G06T 15/00* (2006.01)
(52) U.S. Cl. .................. 345/419; 345/424; 345/427; 382/103; 382/107; 382/128; 600/425; 600/427; 600/443; 700/57; 707/104.1
(58) Field of Classification Search ................ 345/419, 345/423, 424, 427; 600/427, 425, 443; 707/102, 707/104.1, E17.019; 382/103, 107, 128; 700/57
See application file for complete search history.

(56) References Cited

U.S. PATENT DOCUMENTS

| 5,734,384 A | | 3/1998 | Yanof et al. |
| 5,964,707 A | * | 10/1999 | Fenster et al. ............... 600/443 |
| 6,166,740 A | | 12/2000 | Malzbender |
| 6,167,296 A | * | 12/2000 | Shahidi ...................... 600/427 |
| 6,249,713 B1 | * | 6/2001 | Geiger et al. ................. 700/57 |
| 2005/0184986 A1 | * | 8/2005 | Nishitani et al. ............ 345/419 |

FOREIGN PATENT DOCUMENTS

| JP | 2000057381 | 2/2000 |
| WO | WO 02/29764 | 4/2002 |

OTHER PUBLICATIONS

International Search Report; PCT/EP2004/007044; Feb. 24, 2005.

* cited by examiner

*Primary Examiner*—Kimbinh T Nguyen
(74) *Attorney, Agent, or Firm*—Cantor Colburn LLP

(57) ABSTRACT

The invention relates to a method and to a device for the representation of a predeterminable region (3) in multidimensional data sets (2). The data sets (2) are especially made of three or four dimensional image data of an object which is to be examined. The image data is produced by means of one or several receiving elements of the object and especially at least one two-dimensional cut (S) is located and displayed through the predeterminable region (3). The cut (S) is defined by at least one vector plane and/or indicator plane (E1, E2), which are arranged in the multi-dimensional data set (2), by means of a vector (4). Said vector or indicator is fixed by manipulation in the multidimensional data set (2) and/or on, particularly, the two-dimensional cut planes (S1, S2) of the multi-dimensional data sets (2) on at least one vector plane (E1, E2) and the vector and/or indicator (4). Advantageously, the vector (4) is a directional vector (or an arrow) provided with a predeterminable direction and length and extends along the predeterminable region (3).

8 Claims, 3 Drawing Sheets

METHOD AND DEVICE FOR THE REPRESENTATION OF A PREDETERMINABLE REGION IN MULTIDIMENSIONAL DATA SETS

TECHNICAL FIELD OF THE INVENTION

The invention relates to a method of representing a predeterminable region in multidimensional data sets according to the preamble of claim 1 and corresponding apparatus for carrying out such a method according to the preamble of claim 8.

BACKGROUND OF THE INVENTION

Methods and apparatus of this type are known for example from WO 98/20360 of from PCT/EP03/01192. In this case, multidimensional data sets are generated in order to image multidimensional objects, such as for example the heart or liver of a human, the surface of a semiconductor or the weld seam of a packaging. Such multidimensional data sets are generated by recording the object by a suitable recording process, such as for example an x-ray image, an ultrasound image or nuclear spin tomography. To generate a three-dimensional image data set for example, the reconstruction and assembly of one- or two-dimensional image data which have been generated by suitable images is carried out. In the case of an ultrasound image, with the aid of an ultrasound recording apparatus, two-dimensional ultrasound images known as image subdomains are recorded and are so arranged in order in a three-dimensional image data set that the two-dimensional image subdomains supply the relative arrangement of the image data with the correct orientation for the individual three-dimensional image data cubes (known as voxels) of the volume data set.

Such image subdomains generated by two-dimensional recording processes normally correspond to a line-by-line scanning operation, which records the object line by line in a recording direction in which the x-ray machine or e.g. the ultrasound transmitter is moved. The image subdomains generated in the recording apparatus can be transferred digitally or via a video output into a reprocessing apparatus or into a data processing system. There, the two-dimensional images can be stored or directly reprocessed by stacking the individual layers or slices of the object one over another or lining them up next to one another, in order then to obtain for example a three-dimensional representation of the object on the display apparatus.

If the object is a moving object, the corresponding two-dimensional image subdomains can also be provided with an associated time datum, so that each image subdomain can be allocated to a specific state of motion of the object. By means of this time datum, three-dimensional image data sets can be generated which also have corresponding time data. This is known as a four-dimensional data set. A three-dimensional moving object (e.g. the heart of a human) can be shown moving on the screen of a data processing apparatus (i.e. in four dimensions) by showing the three-dimensional image data sets provided with the time data staggered in time sequence.

As soon as a three- or four-dimensional image data set is being dealt with, this can be shown for example on the screen of a data processing apparatus. In all probability, however, the observer of such an image would like to look more closely at certain interesting areas of the object, e.g. the valve of a heart, the solder point of a semiconductor structural element on the printed circuit board, or the point of adhesion of a packaging.

In this case, it is known that the observer, by selecting usually two-dimensional planes of section through the three-dimensional data set, will analyse the predeterminable region by making various planes of section through the predeterminable region and will manipulate these successively until he obtains the desired section representation.

Such a procedure has the disadvantage, however, that "navigation" through the multidimensional data set by means of a usually two-dimensional plane of section is time-consuming, since the plane has to be adjusted by repeated manipulation until the section through the multidimensional data set, e.g. through the volume, offers the corresponding desired view. For example, such a procedure in the case of medical data is often very long-winded and involved, as plural stages (of manipulation) are necessary in order to "cut clear" the appropriate point of interest, i.e. the predeterminable region, and to make it visible.

BRIEF SUMMARY OF THE INVENTION

It is therefore the object of the invention to indicate a method and apparatus for representing a predeterminable region which allows the point of interest or predeterminable region within a multidimensional data set to be found and represented more quickly and easily.

The invention achieves this by the characterising features of the independent claims 1 and 8. Advantageous embodiments and a few examples of the invention are claimed in the subclaims and characterised therein.

The method according to the invention of representing a predeterminable region in multidimensional data sets uses in a conventional manner a multidimensional image data set, which consists of in particular three- or four-dimensional image data of an object to be examined. These image data can be generated by means of any image of the object e.g. by an x-ray image, an ultrasound image, optical and other electromagnetic images. After this multidimensional data set has been generated, also in a conventional manner, the point of interest of the object is represented by making and displaying an in particular two-dimensional section through the predeterminable region.

To avoid the aforesaid disadvantages, however, the section is not made directly through the multidimensional data set, but is defined by at least one vector plane which also lies in the multidimensional data set. The at least one vector plane is in this case fixed by means of a vector, which is in turn fixed in the multidimensional data set or on two-dimensional planes of section through the multidimensional data set.

As soon as a two-dimensional plane of section is made through the multidimensional data set, for example, in the vicinity of the predeterminable region and the point of interest in this two-dimensional plane of section is recognised, the vector (called "pointer" below, for ease of reference) can be fixed on this point of interest within the predeterminable region, so that at least one vector plane (called "pointer plane" below for ease of reference), is defined e.g. at the base or the top of the vector or pointer plane, and the vector plane or pointer plane then defines the section which may be graphically represented and which shows the point of interest within the predeterminable region or the predeterminable region itself in precisely the direction, position and orientation which the user requires. The pointer acts as a "navigation tool".

Advantageously, the pointer is a directional vector adapted to the multidimensional data set with a specifiable orientation or a specifiable length which spans the predeterminable region. If for example a two-dimensional plane of section is made through the solder point of a semiconductor element on a printed circuit board and should the observer wish to observe a solder error visible on the two-dimensional plane of section in a plane which for example is not perpendicular to the plane of section, he or she can mark by means of the pointer the point recognisable on the plane of section and by manipulation of the direction, length and orientation of the pointer place the pointer virtually "intuitively" in the two-dimensional plane of section, in such a manner that the pointer planes fixed by the pointer produce precisely the section which the observer wants to look at.

Advantageously, the pointer is first fixed on a first two-dimensional plane of section by determining the orientation and length of the pointer and by means of a projection positioned perpendicular to a second plane of section, is copied on to this second plane of section and there can be varied likewise by manipulation of the direction, orientation and length. Advantageously, the pointer is in this case simultaneously shown in two, three or more planes of section, so that a variation of the pointer in one of the selected planes of section is also shown on the other planes of section.

Any number of planes of section can be set through the multidimensional data set, the pointer being shown as a projection in all these planes of section. However, in order to achieve an acceleration of the desired section through the area of interest (viewing angle) compared to the conventional method, it suffices in practice as a preferred embodiment of the invention to show the pointer only in one or two planes of section and to manipulate it therein.

By manipulating the pointer, the pointer planes defined by the pointer are manipulated simultaneously. For example, the at least one pointer plane is fixed by the start point or end point of the pointer, the pointer advantageously being positioned orthogonally to the pointer plane. According to a particular embodiment of the invention, a first pointer plane is fixed by the start point and a second pointer plane parallel to the first pointer plane by the end point of the pointer, so that the pointer is orthogonal to both pointer planes.

By a length manipulation of the pointer, in this case, the distance between the pointer planes is altered. By manipulating the orientation of the pointer, the corresponding pointer planes are rotated in multidimensional space about the centre point or point of rotation of the pointer. By manipulating the direction of the pointer, the "viewing direction" in multidimensional space is altered, i.e. the first pointer plane becomes the second pointer plane and vice versa.

According to a further advantageous embodiment of the invention, the direction of the pointer is oriented from the start point to the end point of the pointer. This pointer also acting as a "navigation arrow" may define an endless number of pointer planes which are located between the start point and the end point and are each orthogonal to the pointer. The representation of the predeterminable region or of the point of interest within the multidimensional image data set is then carried out by means of the (two-dimensional) representation of a section which is defined by the pointer planes, which are displaced successively from the start point to the end point of the pointer.

According to a further advantageous embodiment of the present invention, the multidimensional data set is cut off at the pointer plane or the pointer planes by blanking out the corresponding multidimensional image data areas so that only those image data are represented multidimensionally which lie on one side or the other of the corresponding pointer plane or between the pointer planes. If for example two pointer planes defined by the pointer are used, the three-dimensional image data set for example can be "cut off" on the sides of the pointer planes which lie on the side of the respective pointer plane lying opposite to the pointer. The observer can then observe the reduced image data set from both sides of the pointer planes and thus—according to the length of the pointer—observe data set areas or areas of the object of different "thicknesses".

The apparatus according to the invention for representing a predeterminable region in multidimensional data sets has computing means for generating at least one in particular two-dimensional section through the predeterminable region and corresponding display means for displaying the section, the section being defined by at least one pointer plane which lies in the multidimensional data set. As already described, this at least one pointer plane is fixed by means of a pointer which may be manipulated and fixed by manipulation means in the multidimensional data set or on in particular two-dimensional planes of section through the multidimensional data set.

Advantageously, the pointer itself may be displayed on a display of the multidimensional data set or of the two-dimensional planes of section synchronously and may be varied in direction or length or orientation by means of the manipulation means. For example, while a two-dimensional plane of section through the three-dimensional image data set of an object is being represented, the pointer can be applied to a point of interest in the two-dimensional section and so manipulated that this point can be observed by the observer in the direction and orientation and at a specified point of section which is defined by the pointer plane e.g. at the base of the pointer or at the top of the pointer.

In this case, it is advantageous that during a manipulation on a first plane of section, the pointer may be represented simultaneously on a second plane of section, and the corresponding manipulation is represented synchronously there also. Advantageously, the pointer can also be manipulated on the second plane of section or further planes of section.

According to a further advantageous embodiment of the invention, the pointer is also imaged in the multidimensional representation of the data set and can be manipulated therein. If for example a three-dimensional object is represented in three dimensions, the pointer can also be represented and manipulated on this three-dimensional image by superposition of a vector data set of the pointer (open GL), known in the art, with the three-dimensional data set (two-dimensional representation with three-dimensional data).

BRIEF DESCRIPTION OF THE DRAWINGS

A preferred embodiment of the present invention is explained more fully with the aid of the drawings, which show.

DETAILED DESCRIPTION OF THE INVENTION

Figure 1:
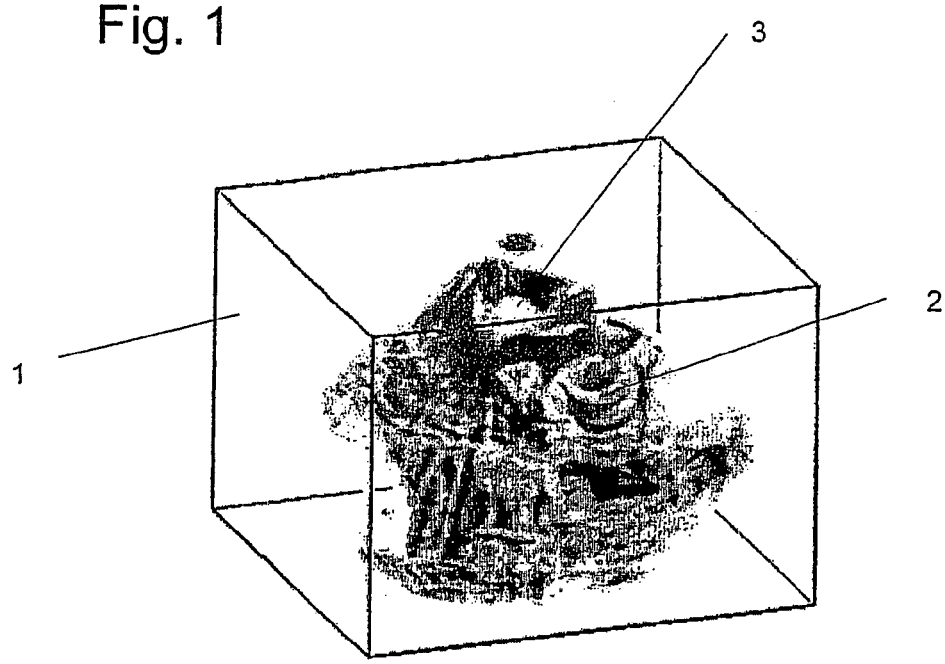
FIG. 1, the three-dimensional data set of a human organ (e.g. a heart) generated by means of ultrasound images (shown in two dimensions)

FIG. 1 shows the three-dimensional representation of an object such as for example a human heart, wherein the data set 2 shown in FIG. 1 has been generated by means of e.g. a large number of two-dimensional ultrasound images, which by means of conventional reconstruction techniques produce a three-dimensional image data set (voxel data set). This volume 1 is generated by corresponding grey-value data of the individual image data cubes (voxels), which are shown in FIG. 1 as grey-value data. FIG. 1 furthermore shows a predeterminable region 3 which is to be examined in more detail.

Figure 2:
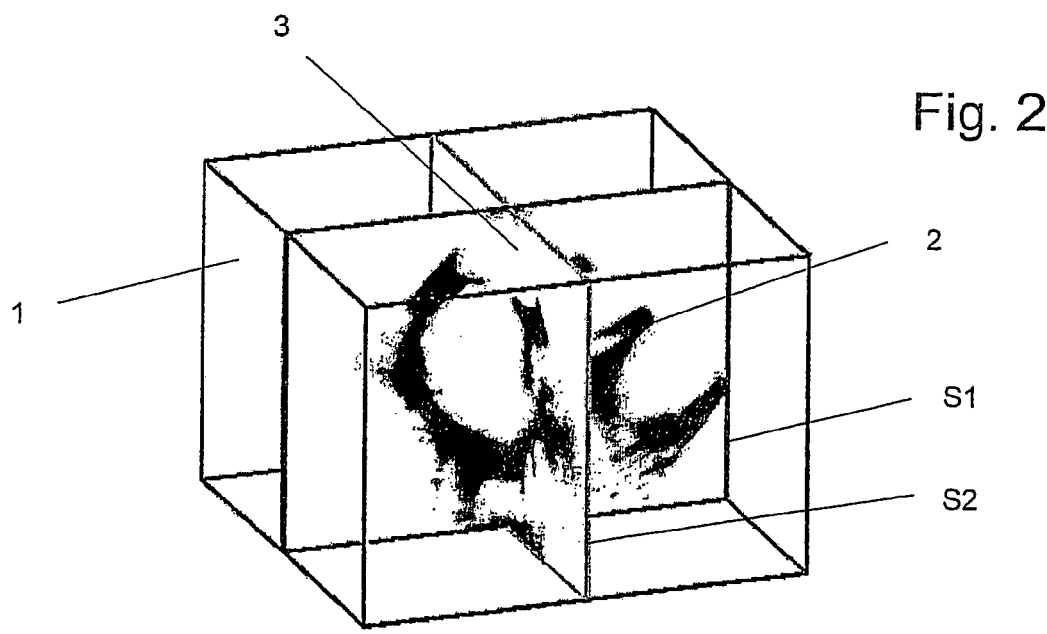
FIG. 2, the representation of the data set according to FIG. 1 by means of two sections S2 and S2.
Figure 3:
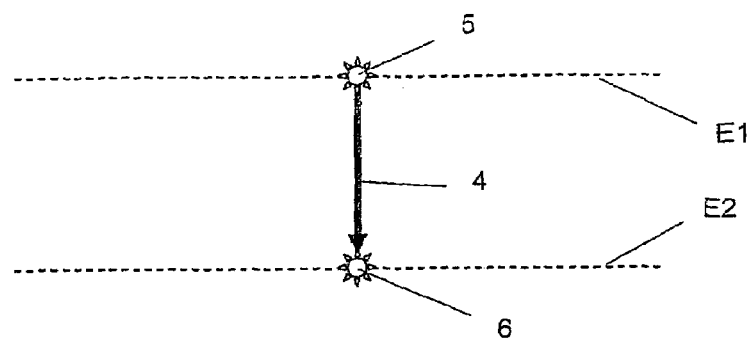
FIG. 3, a diagrammatic representation of the vector or pointer according to the invention with pointer planes.

FIG. 2 shows two sections S1 and S2 through the three-dimensional image data set 2 according to FIG. 1, which do not necessarily have to be perpendicular to one another. FIG. 3 shows diagrammatically a two-dimensional vector or pointer 4, which has a specified length, orientation and direction, which points from a start point 5 to an end point 6. Two vector planes (pointer planes) E1 and E2 are positioned orthogonally on the pointer 4, a first pointer plane E1 touching the pointer 4 at the start point 5, whilst a second pointer plane E2 touches the pointer 4 at the end point 6.

Figures 4A, 4B:
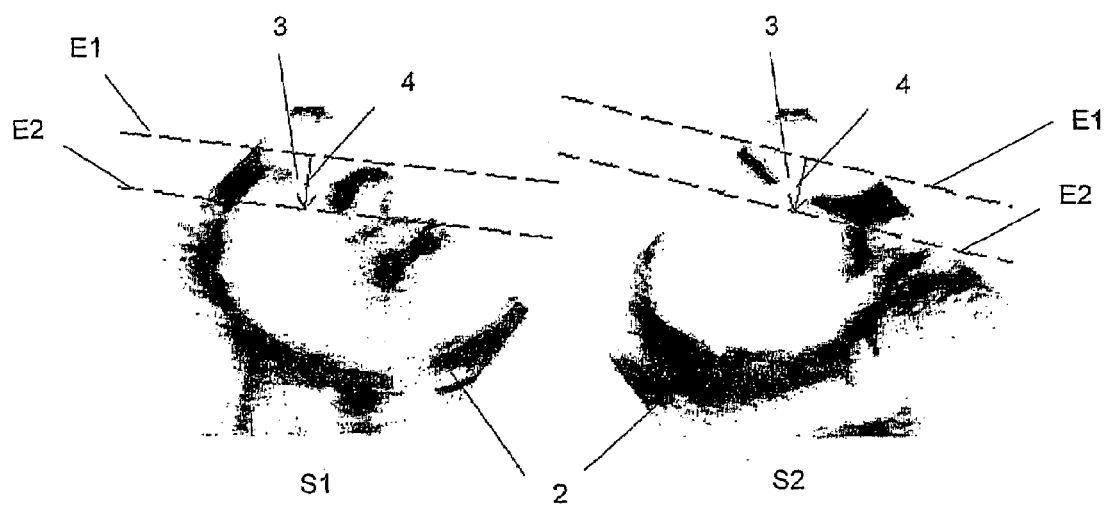
FIGS. 4a/4b the arrangement of the vector or pointer with vector planes (pointer planes) in the sections S1 and S2 according to FIG. 2.

FIGS. 4a and 4b show the sections S1 (FIG. 4a) and S2 (FIG. 4b) according to FIG. 2. The predeterminable region 3 is shown at the upper end of the sections S1 and S2 and it is assumed that the observer would like to examine or observe this predeterminable region more closely. In this case, it is supposed that the observer wishes to observe the predeterminable region 3 in a certain direction, so that then the pointer 4 shown diagrammatically in FIG. 3 is disposed in the first section S1 according to the predeterminable region 3. By varying the length and orientation of the pointer 4, automatically the first and second pointer planes E1 and E2 are varied. In FIG. 4a, these pointer planes extend orthogonally to the pointer 4 and perpendicular to the first section S1.

The two-dimensional vector or pointer 4 shown in FIG. 4a is copied by means of a vertical projection on to the second section S2. By copying the pointer 4 on to the second plane of section S2, the position of the pointer 4 can be varied in any way in three-dimensional space, so that by means of a variation of the start point 5 or end point 6 of the pointer 4, the pointer planes E1 or E2 can be fixed automatically. The lines shown in FIG. 4b represent the projected section lines of the second section S2 with the pointer planes E1 and E2. Obviously, it is also conceivable to fix the pointer 4 first in the second section S2 and then to project the same on to the section S1. The sections S1 and S2 in this case do not necessarily have to be perpendicular to one another.

Figure 5:
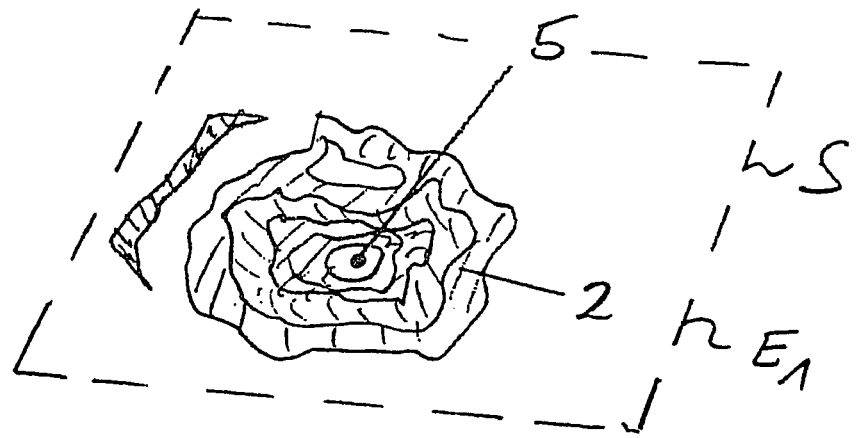
FIG. 5, a plan view of a first pointer plane.
Figure 6:
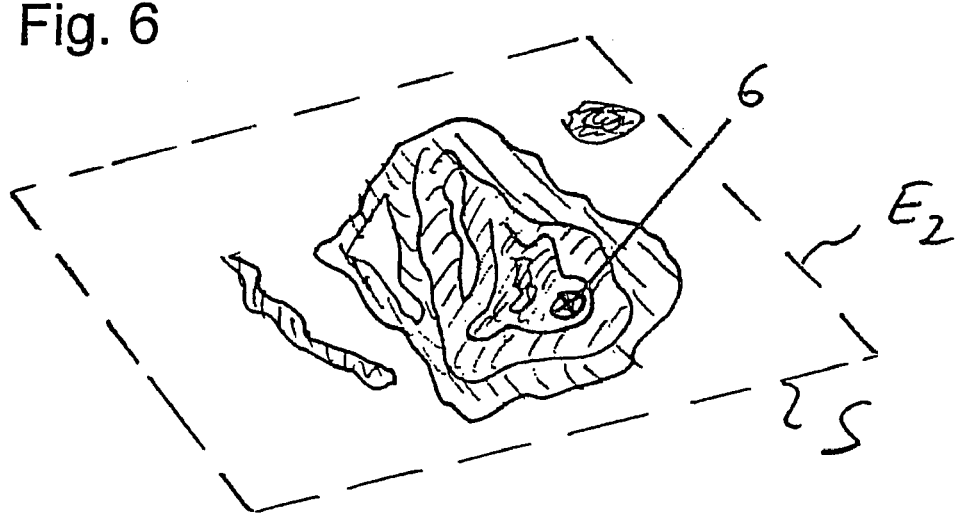
FIG. 6, a plan view of a second pointer plane.
Figure 7:
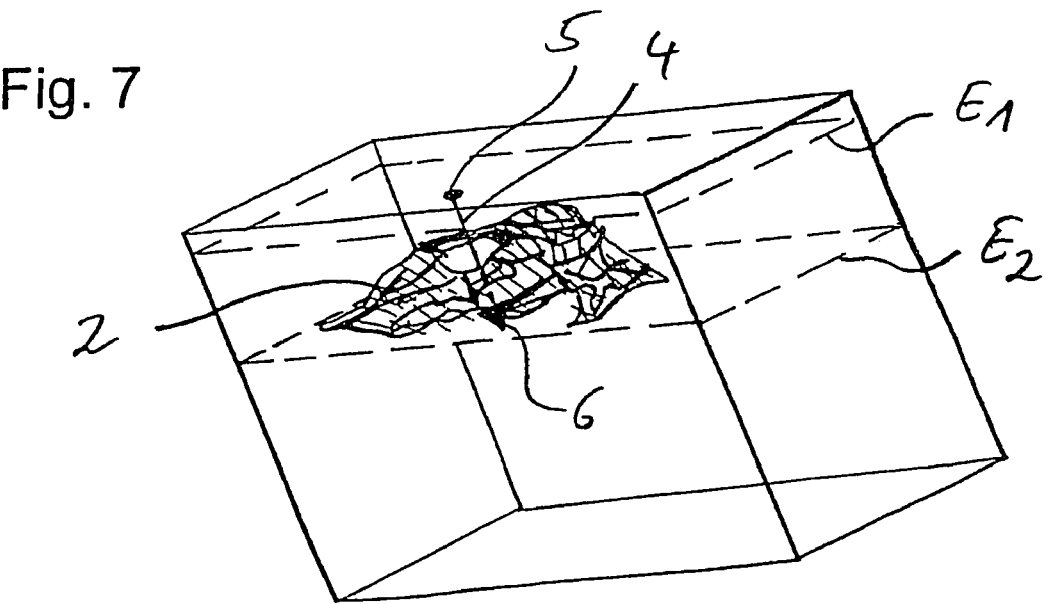
FIG. 7, a three-dimensional diagram (shown in two dimensions) of the image data set (volume) with pointer and pointer planes.

FIGS. 5, 6 and 7 show the section S of interest according to the selection of the observer. If the observer wants for example to observe the predeterminable region 3 in the direction of the pointer 4, then he will choose as a section S the pointer plane E1 and be able to observe the predeterminable region of interest along the pointer 4. In FIG. 5, the start point 5 is shown, which touches the pointer plane E1 and as it were the "surface" of the section S.

If the observer wants to observe the predeterminable region 3 in the opposite direction to the pointer 4, he will use as the section S the second pointer plane E2, which is shown in FIG. 6. FIG. 6 in this case shows the pointer plane E2, i.e. a section made in correct orientation and position through the three-dimensional data set 2.

FIG. 7 shows the overall diagram of the three-dimensional volume 1 with the three-dimensional data set 2, which is only shown between the pointer planes E1 and E2. The pointer planes E1 and E2 are in this case shown in FIG. 7 parallel to the faces of the volume 1, but the pointer planes may lie in any orientation within the volume 1. The pointer planes E1 and E2 are in this case each fixed by the start point 5 and the end point 6 of the pointer 4 and define the corresponding planes of section through the three-dimensional data set 2. This can be observed accordingly from each side of the pointer plane E1 or E2.

According to a particular embodiment of the present invention, the pointer 4 can also be manipulated directly in the three-dimensional data set 2, as is shown in FIG. 7. For example, the start point 5 and/or the end point 6 of the pointer on can be varied in position, length, direction and/or orientation on the screen of a data processing apparatus by "dragging with the mouse", until the observer of the three-dimensional data set 2 obtains the correct setting. Following this, or even parallel thereto, the observer can observe on a further screen or at another point of the same screen the section S, which is defined by the first pointer plane E1 and/or the second pointer plane E2 or by a further pointer plane, which is set for example through the centre of the pointer 4 or at any other point on the pointer.

A method or apparatus of this type is suitable in particular for rapidly representing an area of interest of a (diseased) human organ, which is represented three-dimensionally by an x-ray image or ultrasound image. By moving the pointer intuitively, the doctor can immediately define pointer planes which permit him to gain the desired view of the organ at the predeterminable region 3.

The invention claimed is:

1. A method of representing a predeterminable region in multidimensional data sets, wherein data sets comprise in particular three- or four-dimensional image data of an object to be examined, wherein the image data are generated via one or more images of the object, and wherein at least one in particular two-dimensional section (S) is made through the predeterminable region and displayed on a display, wherein the section (S) is defined by at least one vector plane (E 1, E2), which lies in the multidimensional data set, the at least one vector plane (E 1, E2) is fixed via a vector, and the vector is fixed in the multidimensional data set and/or on in particular two-dimensional planes of section (S 1, S2) through the multidimensional data set, and wherein the vector is a direction vector which has a specifiable orientation and a specifiable length spanning the predeterminable region, the vector being adapted to the multidimensional data set, wherein the vector is fixed on a first two-dimensional plane of section (S 1) by specifying the orientation and length, and the vector so fixed is copied on to a second plane of section (S2), preferably non-parallel to the first plane of section (S1), and correctable thereon.

2. The method according to claim 1, wherein the at least one vector plane (E1, E2) is fixed by a start point and/or end point of the vector and the vector is positioned orthogonally on the vector plane (E1, E2).

3. The method according to claim 2, wherein a first vector plane (E1) is fixed by the start point and a second vector plane (E2) parallel to the first vector plane (E1) is fixed by the end point of the vector and the vector is positioned orthogonally on both vector planes (E1, E2).

4. The method according to claim 1, wherein the direction of the vector is oriented from a start point to an end point, in that the section (S) is defined by a vector plane (E1, E2) positioned perpendicular to the vector, and the representation of the predeterminable region is effected via the section (S) by displacing the vector plane (E1, E2) successively from the start point to the end point.

5. The method according to claim 1, wherein the multidimensional data set is cut off at the vector planes (E1, E2) by the blanking out of corresponding image data and only those image data are shown multidimensionally which lie between the vector planes (E1, E2).

6. An apparatus for displaying a predeterminable region in multidimensional data sets, wherein the data sets comprise in particular three- or four-dimensional image data of an object to be examined and wherein the image data are generated by means of one or more images of the object, comprising computing means for generating at least one in particular two-dimensional section (S) through the predeterminable region and display means for displaying the section (S), wherein the section (S) is defined by at least one vector plane (E1, E2) which lies in the multidimensional data set, the at least one vector plane (E1, E2) is fixed by means of a vector, and the vector is manipulatable and fixed by means of manipulation means in the multidimensional data set and/or on in particular two-dimensional planes of section (S1, S2) through the multidimensional data set, wherein the vector is fixable by means of manipulation means on a first two-dimensional plane of section (S1) by specifying the orientation and length and the vector so fixed is copied on to a second plane of section (S2), preferably non-parallel to the first plane of section (S1), and may be corrected thereon.

7. The apparatus according to claim 6, wherein during manipulation of the vector on the first plane of section (S1), the image of the vector is manipulated synchronously on the second plane of section (S2).

8. The apparatus according claim 6, wherein the vector may be manipulated and copied multidimensionally in the multidimensional data set.

* * * * *